BEST AVAILABLE COPY
W. SCOTT.
VALVE AND OPERATING MECHANISM FOR VALVES.
No. 10,653. Reissued Oct. 20, 1885.
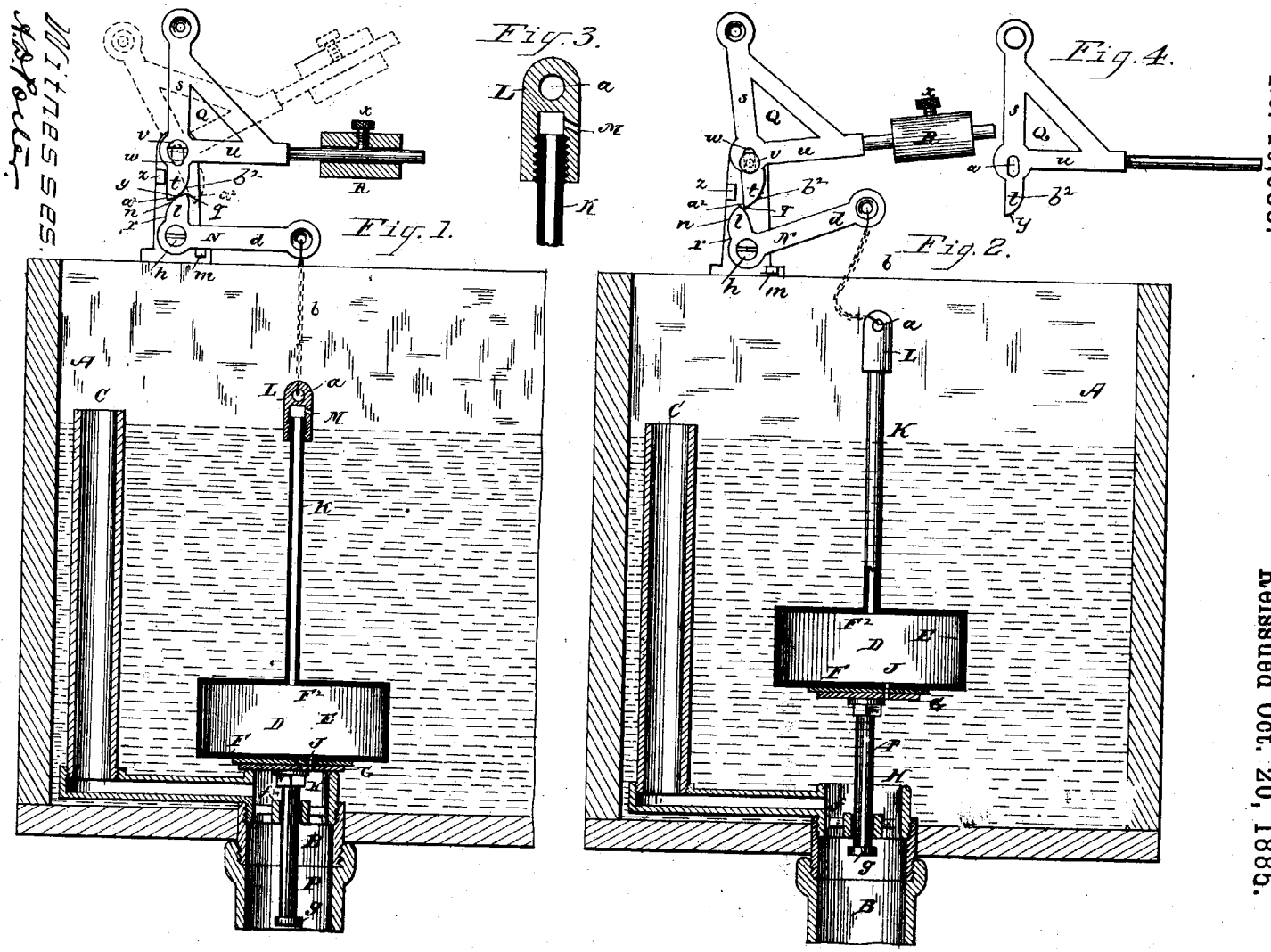
Witnesses.
A. D. Porter.
W. L. Allen
Inventor,
William Scott
N. PETERS, Photo-Lithographer, Washington, D. C.

UNITED STATES PATENT OFFICE.

WILLIAM SCOTT, OF MALDEN, MASSACHUSETTS.

VALVE AND OPERATING MECHANISM FOR VALVES.

SPECIFICATION forming part of Reissued Letters Patent No. 10,653, dated October 20, 1885.

Original No. 297,455, dated April 22, 1884. Application for reissue filed March 25, 1885. Serial No. 160,122.

*To all whom it may concern:*

Be it known, that I, WILLIAM SCOTT, of Malden, in the county of Middlesex and State of Massachusetts, have invented certain new and useful Improvements in Valves and Operating Mechanism for Valves of Water-Closets, &c., of which the following is a full, clear, and exact description.

This invention relates to valves for the outlet or discharge passages of tanks or cisterns containing water or other liquid, and to the mechanism for operating said valves; and in substance it consists, first, in combining with the outlet pipe or discharge of a tank or cistern containing water or other liquid a chambered or hollow valve which has openings or passages for the ingress and egress of water and air, and is otherwise so constructed and arranged that seated it closes said discharge, but raised from its seat it opens said discharge, and from the then ingress of water and the egress of air it is caused to descend to its seat again, closing said discharge, and the water that had entered the valve while open then passes or discharges therefrom; and, second, in combination with a valve mechanism which is constructed and arranged when properly operated to open the valve, and after so opening it leave it free to be closed independently thereof, substantially as hereinafter described.

In the accompanying drawings this invention is illustrated.

Figure 1 is a vertical section of one end of a water-tank, of the outlet and overflow pipes thereto, and of my improved valve for opening and closing said outlet-pipe or water-escape, and an elevation of the mechanism for lifting and opening said valve and allowing it to close. The valve is shown as closed and said operating mechanism in its normal position of rest. Fig. 2 is a similar view to Fig. 1, but showing the valve lifted from its seat and opened and its operating mechanism in its position directly after lifting the valve and just previous to the return thereof in its further movement to its normal position or rest. Figs. 3 and 4 are views in detail, as will hereinafter appear.

In the drawings, A represents a water-tank. This tank has an outlet-pipe or water-escape, B, leading from its bottom, and an overflow-pipe, C, communicating with its outlet-pipe, all as usual in the water system of dwelling-houses, hotels, and other buildings.

D is a hollow or chambered valve, made of sheet metal or other suitable material, and of suitable shape—as, for instance, as shown—E being its body, of a round or cylindrical shape, and F $F^2$ its ends or heads, flat and parallel. The under or bottom head, F, of the chambered valve D has a washer or packing, G, of leather or other suitable material, by which the valve rests upon and makes close contact with the end or seat H of the outlet-pipe B opening to the water-tank, and thus said pipe is closed to the escape of water into it from the tank. This seat H is below the water-level of the tank A, and the chambered valve, when at rest upon it, is wholly submerged in the water of the tank.

J is a passage leading from the outside to the inside of the chambered valve through its said washer, G, and bottom head F. When the valve is closed said passage is in communication with the water-passage of the outlet-pipe.

K is a vertical air-pipe leading through the upper wall, $F^2$, and from the inside of the chambered valve and to a plane above the established level of the water in the tank, and there it is closed with a screw-cap, L, having a side opening or port, M. This side port, M, of air-passage K has an outward downward incline; and *a* is an eye of the screw-cap, connected by a chain, *b*, or other suitable connection to the outer end of an arm, *d*, of a crank or angular lever, N, of the operating mechanism of this invention for the valve D, to be hereinafter described.

P is a central stem projecting downward from the bottom of the chambered valve and passing through a centrally-located guiding-collar, *f*, of the outlet-pipe B. This stem, at its lower end, has a shoulder or collar, *g*, to limit the upward movement or lift of the valve from its seat upon the outlet-pipe B, and in the operation of the valve said stem and guiding-collar *f* act together to guide the valve in a vertical line.

The vertical air-pipe K and vertical stem P are preferably in line with each other and their axes coincident with the vertical axis of the valve-case.

The crank-lever N, having the valve D suspended from its arm $d$, as has been described, turns upon a stationary pin, $h$, and when the lever is in its normal position of rest, said arm $d$ is horizontal, and its other arm, $l$, is vertical, and the horizontal arm $d$ is held from further movement downward by its abutment against a suitably-located stationary rest-pin, $m$. The outer end, $n$, of the vertical arm $l$ is made downwardly rounding or convex, and from its side or edge $q$ toward the horizontal projecting arm $d$ to its opposite side or edge $r$.

Q is a crank or angular lever having three arms, $s$, $t$, and $u$. The arms $s$ and $t$ of said crank-lever Q are in the same line, and the arm $u$ is at right angles thereto, intersecting them in line with the fulcrum-pin $v$ of the lever, and the lever is hung upon said fulcrum-pin by an elongated bearing or slot, $w$, running in the direction of the two arms $s$ and $t$. The arm $u$ has a weight, R, secured to it by a set-screw, $x$, and otherwise arranged to be adjusted on said arm to increase or decrease its leverage, as may be desired. The crank-lever Q, when in its normal position and at rest, has its weighted arm $u$ horizontal, and its arms $s$ $t$, which are in continuation of each other, vertical, and the face $b^2$ and rounded end $y$ of the lower arm, $t$, of said lever in contact with the face $r$ and rounded end $n$ of the vertical arm $l$ of the other crank-lever, N, and the crank-lever Q is held in this position by the abutment of its lower vertical arm, $t$, against the stationary rest-pin $z$. The outer end of the upper arm, $s$, is to be connected in any suitable manner for the crank-lever of which it forms a part to be operated—as, for instance, from the seat or door or floor of the water-closet, or from a pull-handle—and when so operated it is swung into the position shown in dotted lines in Fig. 1, passing in its said swing or movement by the face $b^2$ and rounded end $y$ of its arm $t$ up and over the face $r$ and rounded end $n$ of the arm $l$ to the other crank-lever, N, and finally dropping and coming by the face or side $a^2$ of its said arm $t$ to a rest against the vertical face or side $q$ of said arm $l$ of the other lever, N, and then if set free to the action of its weighted arm $u$ said lever moves backward, and as it is so moved it works by its face $a^2$ against the face $q$ of the lever N, and thus it rocks said lever N, and through its horizontal arm $d$ and connection with the valve the valve is lifted and opened, and finally the faces $a^2$ and $q$ of the levers Q and N escape from each other, releasing the valve to its return to its seat, as before described, and the faces $b^2$ and of the levers come into the position of contact and rest hereinbefore stated.

The swing of the crank-lever Q through the connection attached to its vertical arm $s$ is against its weighted arm $u$, and in its said swing its elongated bearing or slot $w$ allows it to lift in order to pass over the rounded end of the vertical arm $l$ of the lower crank-lever, N, and after it has so passed over to then drop into a position of abutment against the vertical arm $l$ of the under or lower crank-lever, N, and thus, as its said upper crank-lever, Q, returns to its normal position of rest, to rock said lower crank-lever, N, in a direction to lift the valve, and this being accomplished the valve, as before stated, is released or set free to its closing movement, and the crank-levers then come to a rest in their original and normal position for another operation, as before. The valve closed is at rest upon its seat, and then of itself it is incapable of opening, and the water-passage through its bottom head, F, is in communication with the water-passage of the outlet-pipe or water-escape B. The valve opened is above its seat, in which position the water-passage J, through its bottom head, F, is open for the water of the tank to pass into and fill it, and thereby cause it to drop to its seat and to close upon the outlet-pipe B, when the water which had previously entered the chambered valve D discharges itself through the water-passage J into the outlet-pipe. The valve remains closed until again lifted from its seat and opened, when it again fills with water and drops and closes, as before. The valve shown emptied of water is filled with air, and being consequently light the instant it is lifted from its seat it floats upward, opening the outlet-pipe B to the free passage of water from the tank, when by the entrance of water through its water-passage it is rendered heavy, and finally so heavy as to drop to its seat, closing the outlet-pipe to the further escape of water from the tank. The valve so closed then empties itself of water, as before described, and thus is rendered light and capable of floating, when it is again lifted or opened, as has been explained. The water in entering the chambered valve through the water-passage forces the air which is in it out through the air-pipe K, and as the water escapes from the chambered valve the air enters it through said air-pipe. Increasing the diameter of the water-passage of the valve decreases, and decreasing said diameter increases, the time necessary for the filling of the valve, when opened, with water to an extent sufficient to cause it to drop to its seat, and, if desired, said passage may be adapted to be increased and decreased in its size of opening, for the purpose stated.

The air-pipe K should be of sufficient size for the air to freely pass through it into and out of the chambered valve, and by having its side port, M, made downwardly inclined any water discharged through it will be guided directly into the tank.

The mechanism for lifting and opening the valve and allowing it to close, as it is particularly shown and described, lifts and opens the valve on one only of its movements, and that its backward or return movement, and on its other or forward movement it simply comes into position to lift and open the valve when properly operated therefor, and mechanism of such character may be applied to valves constructed and operating otherwise than as herein particularly described; and, again, other arrangements of mechanism for operating the valve D and allowing it to close, as described, may be used with said valve.

The valve D may be guided in its opening and closing movements in many ways other than that particularly shown and described.

Concerning the mechanism herein described through which the valve is opened and allowed to close, it is apparent that the operating-lever has a reciprocating movement, that in the movement of the operating-lever in one direction it works by a face thereof against a face of an abutment which is connected to the valve, and thus the operating-lever rises or opens the valve, and after so opening the valve, on the continuation of the movement of the operating-lever in the same direction, the said working face of said lever escapes from the said working-face of said abutment of the valve, and thus leaves it (the valve) free to close; and, furthermore, it is apparent that in the movement of the operating-lever in the other direction said lever passes by and in contact with said abutment of the valve, and the working-face of said lever which worked against a working-face of said abutment of the valve and thus lifted the valve as aforesaid, is returned to position for operation to again lift or open the valve when the operating-lever is again moved in the proper direction therefor.

A valve, D, constructed and arranged and operating in water-tank A as has been herein described, obviously secures the discharge of a given quantity of water from the tank each time the valve is opened, the tank being supplied with water in any suitable and in any of the well-known manners.

It is plain from the foregoing description that for the operation of the valve as explained communication must be had for the air within the valve to escape from it as water enters it, and that this escape of the air must be at the outside of the water in the tank, and also communication must be had for the water which has entered the valve which opened to pass therefrom when the valve is closed. As particularly shown and described, the said communication for the escape of the air is at and above the water-level of the tank, and the communication for the escape of the water is through the discharge-pipe of the tank; but while both of these forms are efficient it is not intended, however, to limit this invention in these particulars, for said communications may be had in other ways—as, for illustration, by leading the air-pipe from the upper part of the chamber of the valve downward, instead of upward, as shown, and thence to and into the discharge-pipe of the tank, and by providing a pipe separate and distinct from the discharge-pipe through which to conduct the water from the valve when the valve is closed.

This invention as to the valve in substance is of a chambered valve having air and liquid passages in combination with a tank for water, &c., and its discharge, the whole constructed and arranged and operating substantially as described; and as to the mechanism for opening a valve to a water-closet tank, &c., it in substance is to a reciprocating lever in combination with a valve and an adaptation of said lever and of a connection with the valve to secure in one movement of said lever an opening of the valve and a then release of said valve to close, and in the other movement of said lever to place it (said lever) in position for operation to again lift and open the valve on another movement of said lever in proper direction therefor, substantially as described.

Having thus described my invention, what I claim is—

1. The combination, with the outlet or discharge of a tank for water or other liquid, of a chambered valve which has openings or passages for the ingress and egress of the liquid of the tank and of air, and is otherwise constructed and arranged that when seated said discharge is closed and when raised said discharge is opened, and from the then ingress of liquid said valve is again seated, emptying its contents, substantially as described, for the purpose specified.

2. The combination, with a tank for liquid, an outlet-pipe for the liquid, a chambered valve for closing said outlet-pipe, provided with an air-inlet pipe and a liquid-inlet, the liquid-inlet being located at such a point that when the valve is unseated the liquid will pass from the tank into said valve and when seated the liquid will pass therefrom into the outlet-pipe of the tank, substantially as described.

3. The combination, with the seat H of the outlet or discharge B of a tank for water or other liquid, of a chambered valve, D, which has openings or passages J K for the ingress and egress of the liquid of the tank and of air, and is provided with a stem, P, suitably guided, all so that when said valve is seated said discharge is closed and when raised said discharge is opened, and from the then ingress of liquid from the tank said valve is again seated, emptying its contents into said discharge, substantially as described, for the purpose specified.

4. The combination, with the outlet or discharge of a tank for water or other liquid, of a chambered valve which has openings or passages J and K for the ingress and egress of the liquid of the tank and of air, and the port M of the air-passage made downwardly inclining, and all otherwise constructed and arranged that seated said discharge is closed and raised said discharge is opened, and from the then ingress of liquid said valve is again seated, emptying its contents into said discharge, substantially as described, for the purpose specified.

5. In combination, a tank for liquids, an outlet-pipe to said tank, an opening and closing valve to said outlet-pipe, a reciprocating lever for operating said valve, and a part connected to said valve as an abutment of said lever, and said operating-lever and said valve-abutment constructed with faces to have in one movement of said lever a working-contact with each other, and in the other movement thereof a yielding, moving, and non-working contact, whereby in the one movement the valve will be opened and released to close and in the other the lever can return to position to again open the valve, substantially as described.

6. In combination, a tank for liquid, an outlet-pipe to said tank, an opening and closing valve to said outlet-pipe, a reciprocating lever for operating said valve and having opposite faces $b^2$ $a^2$, and a part connected to said valve as an abutment of said lever and having opposite faces $q$ $r$, in one movement of said lever its face $a^2$ and face $q$ of said abutment to work against and to escape from each other, and thus to open and to release the valve to close, and in its other movement its face $b^2$ to pass the face $r$ of said abutment, and thus to bring its said face $a^2$ and face $q$ of said abutment in position to again open the valve, substantially as described.

7. In combination, a tank for liquid, an outlet-pipe to said tank, an opening and closing valve to said outlet-pipe, a reciprocating lever for operating said valve, having opposite faces $b^2$ $a^2$, and an elongated fulcrum or pivotal bearing, and a part connected to said valve as an abutment of said lever and having opposite faces $q$ $r$, in one movement of said lever its face $a^2$ and face $q$ of said abutment to work against and to escape from each other, and thus to open and to release the valve to close, and in its other movement to slide by its elongated bearing on its fulcrum, and its face $b^2$ to pass the face $r$ of said abutment, and thus to bring its said face $a^2$ and face $q$ of said abutment in position to again open the valve, substantially as described.

8. In combination, a tank for liquid, an outlet-pipe to said tank, a reciprocating lever for operating said valve, and a part carried by a reciprocating lever connected to the valve and as an abutment of said operating-lever, and said operating-lever and said abutment of said valve-connected lever constructed with faces to have in one movement of said lever a working-contact with each other, and in the other movement of said lever a yielding, moving, and non-working contact, whereby in the one movement the valve will be opened and released to close, and in the other the operating-lever can return to position to again open the valve, substantially as described.

9. In combination, a tank for liquid, an outlet-pipe to said tank, an opening and closing valve to said outlet-pipe, a reciprocating lever for operating said valve and having opposite faces $b^2$ $a^2$, and a part carried by a reciprocating lever connected to said valve and as an abutment to said operating-lever, and having opposite faces $q$ $r$, in one movement of said operating-lever its face $a^2$ and face $q$ of said abutment to work against and to escape from each other, and thus to open and to release the valve to close, and in its other movement its face $b^2$ to pass the face $r$ of said abutment, and thus to bring its said face $a^2$ and face $q$ of said abutment in position to again open the valve, substantially as described.

10. A lever, N, having arm $d$, connected to a valve of a tank for water or other liquid, and arm $l$, having faces $r$ and $q$, and a rounded outer end, $n$, in combination with an operating-lever, Q, having an arm, $t$, rounded at its outer end and made with faces $a^2$ $y$, and an elongated fulcrum-bearing, $w$, substantially as described, and for the purpose specified.

11. The lever N, having long arm $d$ and short arm $l$, rounded at its free end, in combination with a lever, Q, having its short arm $t$ rounded at its free end, and formed with an elongated fulcrum-bearing, $w$, whereby said levers are adapted to operate substantially as described.

WILLIAM SCOTT.

Witnesses:
ALBERT W. BROWN,
FRANCES M. BROWN.